May 31, 1932.  F. D. FOWLER  1,860,410
EXPANDING PULLEY
Filed Feb. 27, 1928  2 Sheets-Sheet 1

Inventor:
Fred D. Fowler.
by Charles L. Gooding,
Atty.

May 31, 1932.  F. D. FOWLER  1,860,
EXPANDING PULLEY
Filed Feb. 27, 1928    2 Sheets-Sheet
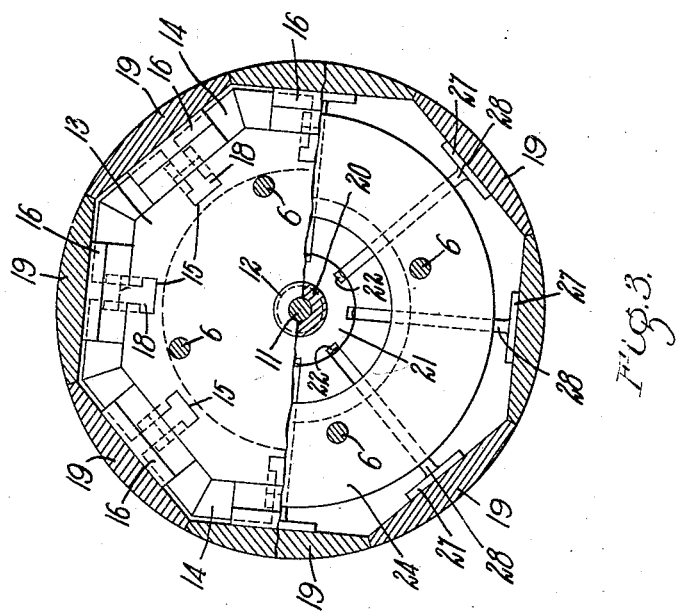
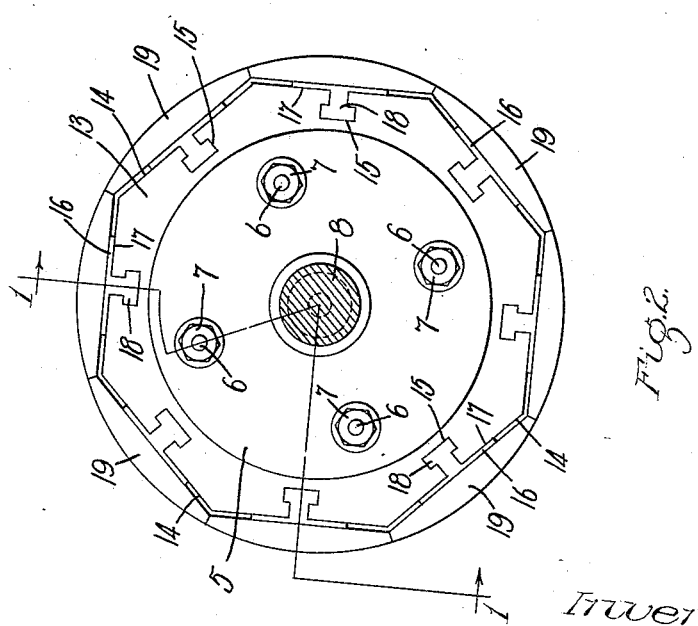
Inventor:
Fred D. Fowler,
by Charles N. Gooding,
Atty.

Patented May 31, 1932

1,860,410

UNITED STATES PATENT OFFICE

FRED D. FOWLER, OF NEWTON, MASSACHUSETTS, ASSIGNOR, BY MESNE ASSIGNMENTS, TO HOOD RUBBER COMPANY, INC., OF WILMINGTON, DELAWARE, A CORPORATION OF DELAWARE

EXPANDING PULLEY

Application filed February 27, 1928. Serial No. 257,230.

This invention relates to an expanding pulley, and has for its object to provide a pulley of the character mentioned which may be used for the purpose of varying the speed of slow running conveyor belts.

The invention contemplates in its construction the employment of novel means for increasing and decreasing the diameter of the pulley, together with a means for supporting the central portion of the periphery of the pulley.

The invention consists in an expanding pulley as set forth in the following specification, and particularly as pointed out in the claims thereof.

Referring to the drawings:

Fig. 2 is a transverse section taken on the line 2—2 of Fig. 1.

Fig. 3 is a transverse section taken on the line 3—3 of Fig. 1.

Like numerals refer to like parts throughout the several views of the drawings.

Figure 1:
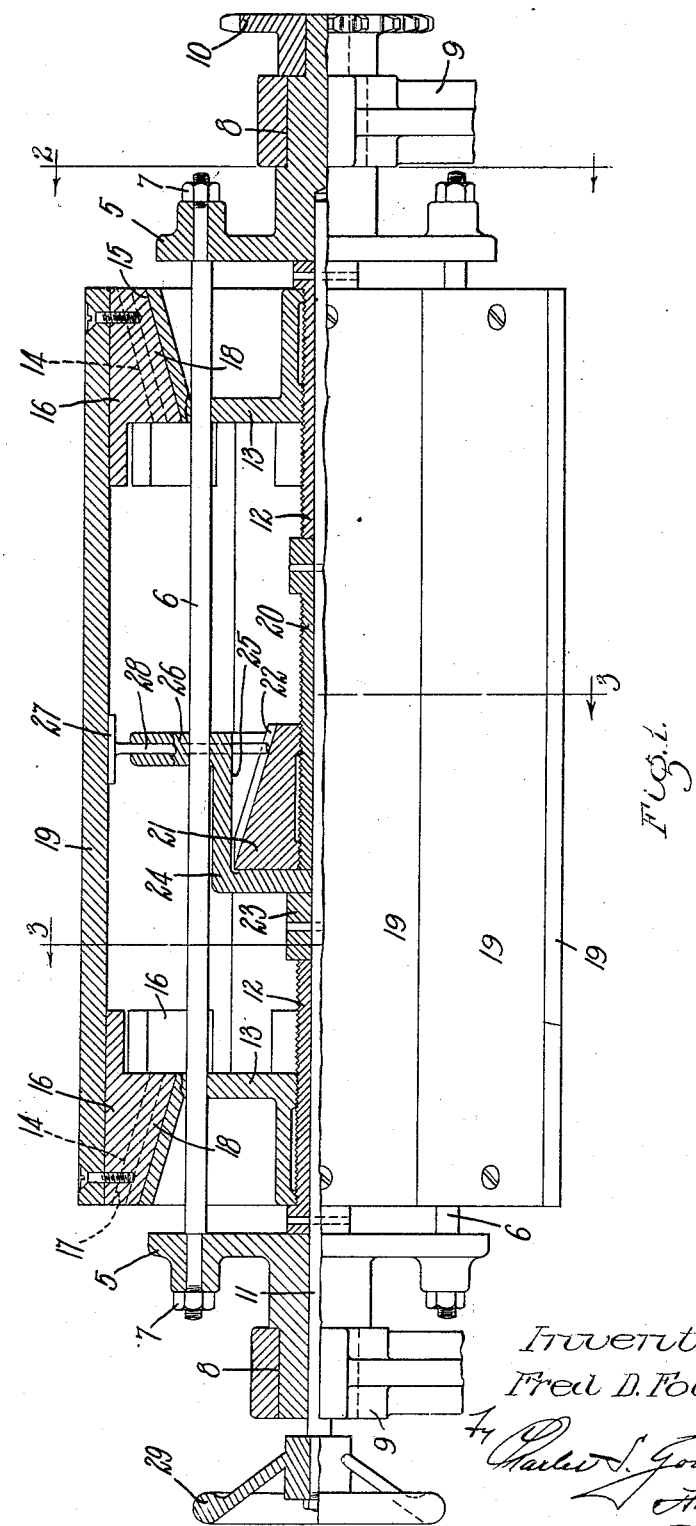
Figure 1 represents a sectional elevation as taken on the line 1—1 of Fig. 2, looking in the direction of the arrows on said line.

In the drawings, 5 represents a pair of oppositely disposed end members which are securely clamped a predetermined distance apart by a plurality of tie rods 6 and nuts 7. Each end member 5 embodies therein a trunnion 8 which is adapted to rotate in a bearing 9. A driving member, preferably a sprocket 10, is rigidly secured in any suitable manner to one of the end members 5.

A shaft 11 is rotatably mounted at its opposite ends in the end members 5. Rigidly secured to the shaft 11 adjacent to each of the end members 5 is a screw-threaded sleeve 12. The sleeves are oppositely disposed to each other upon the shaft 11, one of said sleeves being threaded left-hand and the other of said sleeves being threaded right-hand.

Mounted upon each of the sleeves 12 and having screw-threaded engagement therewith is a pyramidal adjusting member 13 having a plurality of flat inclined sides 14. The pyramidal members 13 are oppositely disposed to each other upon their respective sleeves 12 and taper toward each other. Flat surfaces 14 of the pyramidal members are each provided with a dove-tail shaped groove 15 constituting a guideway, and mounted upon said flat surfaces are shoes 16 each having an inclined surface 17 provided with a dove-tail shaped tongue 18 which has a sliding fit within the groove 15. The dove-tail shaped groove and tongue provide a sliding interlocking connection between the shoes 16 and pyramidal member 13.

Rigidly secured at its opposite ends to the opposite shoes 16 of each pyramidal member 13 is a slat 19 constituting a segmental section. The sections 19 may be constructed of either wood or metal, and constitute the periphery of the pulley, and when the latter is located in its closed or contracted position, the sides of adjacent sections abut one against another as illustrated in Figs. 2 and 3 to form a perfect cylinder.

Also rigidly secured to the shaft 11 between the sleeves 12 is another screw-threaded sleeve 20, the screw threads being of the same size and character as are provided upon the left-hand sleeve 12. Mounted upon the sleeve 20 is a tapered member 21, preferably having an inclined periphery having the same degree of taper as does the left-hand pyramidal member 13. A plurality of grooves 22 are provided in the periphery of the member 21, there being the same number of grooves as there are flat sides of the pyramidal members. The grooves 22 are located in alignment with the grooves 15 of the pyramidal members, and the inclination of the grooves 22 must be exactly the same as the inclination of the grooves 15.

Mounted upon the shaft 11 between an extremity of the sleeve 20 and a collar 23 which is rigidly secured to said shaft is a cylindrical guide member 24 having a recess 25 within which the tapered member 21 is partially enclosed. The guide member 24 has a flange 26 projecting outwardly therefrom at one end thereof, and slidably mounted within this flange are a plurality of supports 27, each of which has a shank 28 which extends through the guide member 24 and into a groove 22 of the tapered member 21, the inner extremity of said shank contacting with the bottom of the groove 22. The outer extremity of the supports 27 contact at all times with the inner surface of the segmental sections 19 and prevent the latter from being sprung inwardly.

The tie rods 6 project through the flange 26 of the cylindrical member 24 and prevent the latter from rotating upon the shaft 11. The tie rods 6 also project through the opposite pyramidal members 13 with which they have a sliding fit thereby preventing said members from being rotated upon their respective sleeves 12. When the sleeves 12 are rotated to expand or contract the pulley, the pyramidal members will slide toward each other upon the tie rods.

The shaft 11 is rotated within the end members 5 by means of a hand wheel 29.

The general operation of the device hereinbefore specifically described is as follows:—Assuming that the pulley is in its closed or contracted position, as illustrated in the various figures of the drawings, and it is desired to increase the diameter of said pulley, the hand wheel 29 is rotated in the proper direction to force the pyramidal members 13 toward each other upon their respective sleeves 12. During the inward movement of the pyramidal members, the inclined surfaces 14 of said members will co-operate with the oppositely disposed inclined surfaces 17 of the shoes 16 to force the latter radially outwardly. It is evident that this outward movement will be limited by the length and degree of taper of the inclined surfaces. As the shoes 16 move outwardly the edges of adjacent segmental sections 19 will separate, leaving a space therebetween and it is evident that at such times the pulley will not be a true cylinder. This condition, however, will not affect the operation of the pulley in any way.

When the shaft 10 is rotated to expand the pulley, the sleeve 20 will also be rotated to move the tapered member 21 toward the right hand pyramidal member 13, and the inclination of the groove 22 being the same as that of the groove 15, the support 27 will be forced outwardly the same amount that the shoes 16 are forced outwardly so that the central portion of each of the segmental strips 19 will be engaged at all times, and when the segmental strips are constructed of wood, they will be prevented from being sprung inwardly.

It is evident that in narrow faced pulleys, the central strengthening mechanism may be omitted if it is so desired.

In decreasing the diameter of the pulley, the hand wheel 29 is operated to rotate the shaft 11 and sleeves 12 and 20 in an opposite direction to that required for expanding the pulley.

I claim:

1. An expanding pulley having, in combination, a pair of end members, tie rods spaced from the pulley axis and secured to said end members, a pair of oppositely disposed tapered members slidably engaging said tie rods, shoes slidably mounted upon said tapered members, segmental sections fast to the shoes and constituting the periphery of the pulley, and means rotatable within both of the tapered members to impart a longitudinal movement thereto whereby the shoes are moved radially thereon to vary the diameter of the pulley.

2. An expanding pulley having, in combination, a pair of end members rotatable in bearings, tie rods for said end members, a driving element secured to one of said members, a pair of oppositely disposed tapered members, shoes having sliding interlocking engagement with said tapered members, segmental sections fast to the shoes and constituting the periphery of the pulley, and means rotatable within both of the tapered members and adapted to impart a longitudinal movement thereto whereby the shoes are moved radially thereon to vary the diameter of the pulley.

3. An expanding pulley having, in combination, a pair of end members, means to tie said end members together, a pair of oppositely disposed tapered members engaging said tie means, shoes slidably mounted upon said tapered members, slats fast to the shoes and constituting the periphery of the pulley, a shaft rotatable in the end members and having screw-threaded engagement with the tapered members, the axis of the shaft coinciding with that of the pulley, and means to rotate said shaft whereby a longitudinal movement is imparted to the tapered members and the shoes are moved radially thereon to vary the diameter of the pulley.

4. An expanding pulley having, in combination, a pair of end members, tie rods for said end members, a pair of oppositely disposed pyramidal members slidably engaging said tie rods and provided with grooves upon the flat sides thereof, shoes slidably mounted upon the flat sides of said pyramidal members and having tongues located within the grooves thereof, slats fast to the shoes and constituting the periphery of the pulley, sleeves having screw-threaded engagement with the tapered members, and means to rotate said sleeves to move the same toward or away from each other simultaneously whereby a longitudinal movement is imparted to the tapered members and the shoes are moved radially thereon to vary the diameter of the pulley.

5. An expanding pulley having, in combination, a pair of end members, tie rods for said end members, a pair of oppositely disposed tapered members slidably engaging said tie rods, shoes slidably mounted upon said tapered members, segmental sections fast to the shoes and constituting the periphery of the pulley, another tapered member, a guide member, intermediate supports for each of said segmental sections slidably mounted in said guide member for movement radially of the pulley and engaging said last-named tapered member, and means to impart a longitudinal movement to all of said tapered members in unison, whereby said sections are moved radially to vary the diameter of the pulley and the intermediate supports for the sections are continually held in engagement therewith.

6. An expanding pulley having, in combination, a pair of end members, tie rods for said end members, a pair of oppositely disposed tapered members provided with guideways thereon, shoes slidably mounted upon said guideways, segmental sections fast to the shoes and constituting the periphery of the pulley, another tapered member, a guide member, intermediate supports for each of said sections slidably mounted in said guide member for movement radially of the pulley and engaging said last-named tapered member, and means comprising a shaft rotatable in said end members and said guide member to impart a longitudinal movement to all of said tapered members in unison, whereby the sections are moved radially to vary the diameter of the pulley and the intermediate supports for the sections are continually held in engagement therewith.

7. An expanding pulley having, in combination, a pair of end members, tie rods for said end members, a pair of oppositely disposed tapered members slidably engaging said tie rods, shoes slidably mounted upon said tapered members, segmental sections fast to the shoes and constituting the periphery of the pulley, another tapered member, a guide member, intermediate supports for each of said segmental sections slidably mounted in said guide member for movement radially of the pulley and engaging said last-named tapered member, sleeves having screw-threaded engagement with the tapered members, and means to rotate all of said sleeves in unison whereby a longitudinal movement is imparted to all of the tapered members, the shoes being moved radially to vary the diameter of the pulley, and the intermediate supports for the sections being continuously held in engagement therewith.

8. An expanding pulley having, in combination, a pair of end members connected by tie rods, a shaft rotatable in the end members, the axis of the shaft coinciding with that of the pulley, a driving element secured to one of said members, adjusting members slidably engaging said tie rods, means to impart movement to the adjusting members axially of said shaft on relative rotation of the shaft, segmental sections at the periphery of the pulley, and means to impart movement to the sections radially of the shaft on axial movement of said adjusting members.

In testimony whereof I have hereunto set my hand.

FRED D. FOWLER.